United States Patent [19]

Koshiba

[11] Patent Number: 5,187,033
[45] Date of Patent: Feb. 16, 1993

[54] LITHIUM SECONDARY BATTERY

[75] Inventor: Nobuharu Koshiba, Nara, Japan

[73] Assignee: Matsushita Electric Industrial Co., Ltd., Osaka, Japan

[21] Appl. No.: 634,388

[22] Filed: Dec. 27, 1990

[51] Int. Cl.$^5$ .................. H01M 6/14; H01M 4/62; H01M 4/74

[52] U.S. Cl. .................. 429/194; 429/232; 429/235; 429/236; 429/237; 429/241; 429/245

[58] Field of Search .............. 429/194, 232, 235, 236, 429/237, 241, 245

[56] References Cited

U.S. PATENT DOCUMENTS 4,874,680 10/1989 Koshiba et al. .................. 429/197
5,015,547 5/1991 Koshiba et al. .................. 429/194

Primary Examiner—Anthony McFarlane
Assistant Examiner—Nhat Phan
Attorney, Agent, or Firm—Stevens, Davis, Miller & Mosher

[57] ABSTRACT

The present invention relates to a lithium secondary battery provided with a positive electrode having vanadium peroxide as an active material, a negative electrode having niobium pentoxide doped with lithium as an active material, and an electrolyte of an organic solvent in which a lithium salt is dissolved. A corrosion-resistant metal powder is used as a conductive material in the negative electrode. In addition, a corrosion-resistant metal may be used as a current collector of the negative electrode. This battery is excellent in charging and discharging cycle characteristics and storage life, is superior in moldability of the negative electrode composition and can be mass-produced.

11 Claims, 1 Drawing Sheet

LITHIUM SECONDARY BATTERY

BACKGROUND OF THE INVENTION

The present invention relates to a rechargeable lithium secondary battery which is usable as a transferable DC source and a buck-up electric source.

More particularly, it relates to a lithium secondary battery which is constructed of a non-aqueous electrolyte containing lithium ions, a positive electrode comprising a metal oxide, and a negative electrode comprising a metal oxide doped with lithium.

Lithium secondary batteries which can be charged and in which lithium is used as an active material of negative electrode have recently attracted much attention and have been extensively studied and developed because they have theoretically high energy density.

However, owing to dendritic or moss-like lithium produced during charging and discharging, positive and negative electrodes are in a state which can cause a so-called internal short circuit or result in the gradual collapsing of the shape of a negative electrode and the deterioration thereof. Therefore, it has been very difficult to attain a long charging and discharging cycle life.

One approach to solve this problem is to use a lithium alloy which can occlude and release lithium. But when a large amount of lithium is occluded and released, the alloy is apt to collapse and a sufficient effect cannot necessarily be obtained, therefore improvement of the negative electrode has still been desired.

As another approach to solve the problem, there is a battery system in which a vanadium pentoxide high in potential is used as a positive electrode and a niobium pentoxide doped with lithium is used as a negative electrode (see Japanese Patent Kokoku (Post. Exam. Publication) No. 62-59412). The niobium pentoxide used as a negative electrode in the battery can be easily doped and undoped with lithium and is considered to be considerably longer than the above-mentioned lithium alloy in charging and discharging cycle life.

As a result of various examinations on the above combination, the following problems have been found.

The first problem is as follows: When a battery is made using a mixture of vanadium pentoxide, carbon black as a conductive material and a fluorine-resin as a binder as a positive electrode, a mixture of niobium pentoxide doped with lithium, carbon black as a conductive material and fluorine-resin as a binder as a negative electrode and an organic solvent in which a lithium salt is dissolved as an electrolyte, a voltage of about 2 V can be obtained just after the construction. However, when the battery is stored in an atmosphere at a high temperature such as 60° C., the voltage gradually decreases and simultaneously the selfdischarging proceeds, and finally the electric capacity is lost. Even if the battery is charged with a voltage of 2 V, the electric capacity is not sufficiently recovered and sometimes decreases to less than half of the initial capacity. Thus, even if the usual charging and discharging cycle life is long, no reliable cycle life can be expected for a long period and this must be improved.

Another problem is that a substance such as niobium pentoxide is low in processability and is not suitable for the mass-production of batteries and this poor processability must be improved.

SUMMARY OF THE INVENTION

A main object of the present invention is to provide a lithium secondary battery in which vanadium pentoxide is used for a positive electrode and a metal oxide doped with lithium, especially preferably a niobium pentoxide doped with lithium, is used for a negative electrode and which has an improved formulation of the negative electrode, is excellent not only in charging and discharging cycle life, but also in storage stability and in mass-productivity thereof.

As a result of intensive research conducted by the inventors, it has been found that the above object can be attained by using a corrosion-resistant metal powder as a conductive material in the negative electrode and preferably using a metal plate or porous metal body superior in electrical conductivity and excellent in corrosion resistance as a current collector for electrical connection with a negative electrode case.

Other objects and detail of the present invention will be clear from the following examples which illustrate the invention referring to the drawing.

DESCRIPTION OF THE INVENTION

Figure 1:
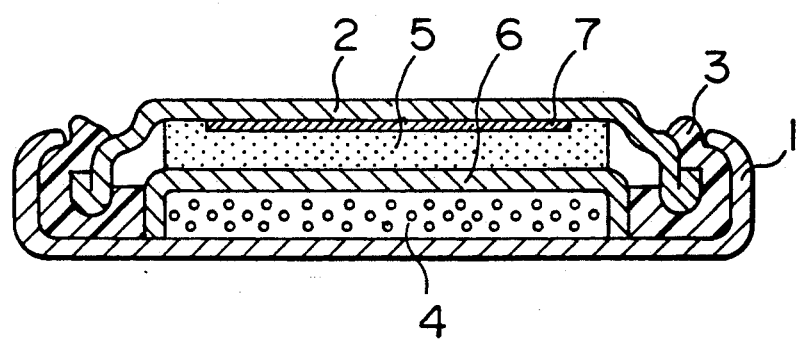
FIG. 1 is a longitudinal sectional view of a coin-shaped lithium secondary battery of the present invention which can be charged and discharged.

In general, carbon black is used as a conductive material in the composition of a positive electrode in lithium secondary batteries in which an organic electrolyte is used. This is because carbon black is excellent in electrical conductivity and has a large surface area and, besides, is stable also at a high potential in an organic solvent.

However, when a metal oxide such as niobium pentoxide is used for a negative electrode as in the present invention, if a carbon type material is used as the conductive material, its potential is close to that of lithium and hence, carbon per se is doped with lithium.

Although not exactly clear, lithium becomes easier to dope with the potential becoming baser in the region of lower to about 2 V than that of pure lithium.

It is considered that when carbon is doped with lithium, the surface layer of carbon is converted to lithium carbide to deteriorate the electrical conductivity or increase the contact resistance per se. In addition, it is also considered that when the battery is left at a high temperature, lithium in the metal oxide of the negative electrode further migrates into carbon and the concentration of lithium in the metal oxide of the negative electrode decreases.

For these reasons, adverse effects caused by doping with lithium can be inhibited by avoiding the addition of carbon to the negative electrode and instead, by using a corrosion-resistant metal powder excellent in electrical conductivity as aforementioned.

The reason for using the corrosion-resistant metal here is that when the battery is discharged, the potential of the negative electrode rises and thus the metal becomes easy to be corroded. For example, when cadmium or lead is used, if the potential of the negative electrode increases to 2 V or more than that of lithium, the cadmium or lead dissolves little by little to cause an internal short circuit of the battery, which damages the function of the battery.

Therefore, use of metals having a higher corrosion resistance is advantageous for resistance to over discharging of the battery.

These metals are preferably Pt, Ag, Ni, Al, Cu, and Mo.

Ideally, it is desired to use such a metal in an amount of 100% as the conductive material. However, practically, when the conductive material comprises only a metal powder, this must be added to the composition of the negative electrode at a considerably high ratio and the moldability of the composition is not necessarily better than that of carbon. Accordingly, from the points of the amount of the conductive material added and improvement of the moldability of the negative electrode composition, it is preferred to use carbon in an amount of as small as possible so as to give no adverse effect and to add a suitable amount of a corrosion-resistant metal powder as a main component.

On the other hand, when this negative electrode composition is placed in a negative electrode case, for example, in the case of a coin-shaped battery, the composition is entirely put in the negative electrode case and the electrical connection to the negative electrode case is generally conducted through pressure contact between the negative electrode composition and the inner surface of the negative electrode case. In this case, a carbon coat can be previously provided on the inner surface of the negative electrode case which contacts the negative electrode composition in order to reduce the contact resistance between the case and the composition and to attain stable maintenance. In this case, too, an adverse effect due to the doping of lithium into carbon is considered to occur as mentioned above. Since that portion corresponds to the interface between the negative electrode composition and the negative electrode case, if a lithium carbide layer is once formed over all of the surface, there is the possibility of the negative electrode being in the electrically isolated state to seriously deteriorate the function of the battery. Therefore, it is preferred to use a metallic conductor for this portion for further improvement of the storage life.

As the current collector of the negative electrode case, a plate or porous body such as a net or lath of a corrosion-resistant metal is preferred and this is welded to the case, so that the negative electrode composition can intrude into this current collector.

As this corrosion-resistant metal, suitable are Pt, Ag, Ni, stainless steel and the like.

In order to further increase conductivity and to reduce cost, Ni, stainless steel or the like which is plated with Ag can be preferably employed.

The present invention will be illustrated in detail by the following examples.

EXAMPLE 1

FIG. 1 is a longitudinal cross-sectional view of the lithium secondary battery according to the present invention. In FIG. 1, 1 indicates a case which also serves as a positive electrode terminal, 2 indicates a sealing plate which also serves as a negative electrode terminal, and 3 indicates a gasket made of polypropylene which insulation-seals the case and the sealing plate. 4 indicates a positive electrode, which was prepared by kneading 90 wt % of vanadium pentoxide, 5 wt % of carbon black as a conductive material and 5 wt % (solid content) of an aqueous dispersion of a fluorine-resin as a binder, drying and grinding the kneaded product, molding the powders into a pellet of 15 mm in diameter, then vacuum drying the pellet at 150° C. and dehydrating the dried pellet. The amount of vanadium pentoxide in this positive electrode 4 was about 238 mg and the theoretical electric capacity was about 35 mAh for one electron reaction.

5 indicates a negative electrode and when the conductive material comprised only a metal powder, this was in an amount of 30 wt % and when the conductive material comprised a mixture of the metal powder as a main conductive material and carbon black as an auxiliary conductive material, these were used in amounts of 20 wt % and 3 wt %, respectively, as shown in Nos. 1–13 in Table 1.

TABLE 1

| | Construction of negative electrode | | | | |
|---|---|---|---|---|---|
| | Conductive materials in negative electrode composition | | | Current collector of negative electrode Plate of 0.1 mm thick and 10 × 10 mm or net of | Conductive material in negative |
| No. | Main conductive material | Auxiliary conductive material | No. | 0.1 mm in wire diameter and 10 × 10 mm | electrode composition |
| 1 | Pt 30 wt % | — | 14 | Ag plate | Ag 30 wt % |
| 2 | Ag 30 wt % | — | 15 | " | Carbon 7 wt % |
| 3 | Ni 30 wt % | — | 16 | Ni plate | Ag 30 wt % |
| 4 | Al 30 wt % | — | 17 (No. 2) | Stainless steel plate | " " |
| 5 | Cu 30 wt % | — | 18 | Ag plated Ni plate | " " |
| 6 | Mo 30 wt % | — | 19 | Ag plated stainless steel plate | " " |
| 7 | Pt 20 wt % | Carbon black 3 wt % | 20 | Pt net | " " |
| 8 | Ag 20 wt % | " | 21 | Ag net | " " |
| 9 | Ni 20 wt % | " | 22 | Nickel net | " " |
| 10 | Al 20 wt % | " | 23 | Stainless steel net | " " |
| 11 | Cu 20 wt % | " | 24 | Ag plated Ni net | " " |
| 12 | Mo 20 wt % | " | 25 | Ag plated stainless steel net | " " |
| 13 | Cd 30 wt % | — | 26 | Carbon coated layer | Carbon 7 wt % |

An aqueous dispersion of a fluorine-resin in an amount of 5 wt % (solid content) as a binder and the remainder of the niobium pentoxide were well kneaded with a negative electrode composition together with the abovementioned conductive material and then, the kneaded product was dried and ground. Then, the powders were molded into a pellet of 15 mm in diameter and the pellet was vacuum dried at 150° C. and dehydrated.

A desired lithium foil was brought into close contact with the above pellet-like composition and this was dipped in a propylene carbonate solution containing 1 mol/1 of lithium perchlorate to dope lithium into the niobium pentoxide. Its electric capacity was about 1.3 times that of the positive electrode, but was nearly the same as the positive electrode in effective electric capacity.

6 indicates a separator comprising a two-layer laminate of a microporous polypropylene film and a nonwoven fabric.

The electrolyte of the battery was a solution prepared by dissolving 1 mol/1 of lithium perchlorate in a mixed solvent comprising propylene carbonate and 1,2-dimethoxyethane (1:1 in volume). 7 indicates the current collector of the negative electrode. In Nos. 1-13, a square plate of stainless steel SUS 304 having a size of 10×10 mm with a thickness of 0.1 mm was used as the current collector, which was welded to a negative electrode case 5.

The size of this battery was 20 mm in diameter and 2.5 mm thick.

EXAMPLE 2

Batteries were made in the same manner as in Example 1, except that a Ag powder was used as most of the conductive materials in the negative electrode composition (carbon black was partly used for comparison) for making comparison on the current collector of the negative electrode case.

The combination of the current collector of the negative electrode case and the conductive material in the negative electrode composition was as shown in Nos. 14-26 in Table 1.

No. 26 was a conventional example in which both the current collector and the conductive material were comprised of carbon black. In No. 15, carbon black was used as only a conductive material in the negative electrode composition and the Ag plate was used as the current collector. No. 17 was the same as No. 2.

EXAMPLE 3

Batteries were made in the same manner as in Example 1, except that manganese dioxide, cobalt oxide, and lithium-containing nickel oxide were used in place of vanadium pentoxide in the positive electrode and the negative electrode had the same construction as in No. 16 and No. 26.

Batteries were fabricated as in Examples 1 and 2 and were aged for 2 days and, thereafter, discharged at 0.5 mA and the capacity obtained until a voltage reached 1 V was measured. When the capacity obtained in No. 1 was considered to be 100, the results were as shown in Table 2. These values were taken as initial capacity.

TABLE 2

| | | Comparison of capacity at various conditions | | |
|---|---|---|---|---|
| | Initial capacity (until 0.5 mA/1 V) | After stored at 60° C. for 40 days (until 0.5 mA/1 V) | After stored at 60° C. for 40 days (until 0.5 mA/1 V) | After overdischarging at 60° C. for 40 days with 3 kΩ (until 0.5 mA/1 V) |
| 1 | 100 | 92 | 70 | 90 |
| 2 | 105 | 92 | 73 | 92 |
| 3 | 98 | 90 | 69 | 83 |
| 4 | 95 | 89 | 63 | 78 |
| 5 | 97 | 87 | 65 | 79 |
| 6 | 95 | 87 | 65 | 85 |
| 7 | 103 | 87 | 80 | — |
| 8 | 99 | 86 | 81 | — |
| 9 | 98 | 83 | 78 | — |
| 10 | 97 | 82 | 76 | — |
| 11 | 95 | 82 | 76 | — |
| 12 | 96 | 83 | 77 | — |
| 13 | 95 | 81 | 60 | 5 |
| 14 | 107 | 93 | 74 | — |
| 15 | 98 | 75 | 58 | — |
| 16 | 95 | 93 | 70 | — |
| 17 | 105 | 92 | 70 | — |
| 18 | 107 | 95 | 74 | — |
| 19 | 106 | 95 | 74 | — |
| 20 | 102 | 96 | 83 | — |
| 21 | 100 | 95 | 85 | — |
| 22 | 98 | 93 | 80 | — |
| 23 | 96 | 92 | 78 | — |
| 24 | 106 | 96 | 85 | — |
| 25 | 105 | 95 | 85 | — |
| 26 | 95 | 48 | 40 | — |

In a comparison of initial capacities, there was no large difference in discharging at 0.5 mA. However, these batteries were charged at a constant voltage of 2 V for 10 hours and then left to stand in an atmosphere at a high temperature of 60° C. for 40 days and then again charged at 2 V for 10 hours. Thereafter, they were separately discharged at 0.5 mA and 5 mA and the capacity until the voltage reached 1 V was measured and the retention rate of capacity in comparison with the initial capacity was calculated. The results are also shown in Table 2. In the case of comparison at 0.5 mA, No. 26 in which carbon was used for both the conductive material in the negative electrode composition and the current collector of the negative electrode case decreased in retention rate to less than 50% while Nos. 1-6 and 13 in which metals were used for both of them retained their capacity at a considerably high rate.

In Nos. 7-12 in which carbon was added in an amount of 3 wt % to the main conductive material in addition to the metal powder, the retention rate of capacity was also high, namely, about 85%.

From the above results, it can be seen that the high temperature storage stability of the battery can be improved by using a metal powder as the main conductive material of the negative electrode. Furthermore, it can be seen that fortunately, when the content of carbon black in the auxiliary conductive material is 3 wt %, its effect is small. The amount of carbon black may be 3 wt % as mentioned above, but if it is 1 wt %, the storage stability can be further improved. Moreover, it can be seen from the results on No. 15 that even if carbon black is used as conductive material in the negative electrode composition, considerable improvement can be attained only by using Ag plate as the current collector of the negative electrode. In addition, when comparison is made on the results at 5 mA discharging, Nos. 1–6, 13 and 14–19 in which a plate-like metal was used as the current collector of the negative electrode showed somewhat large deterioration and use of net-like collector as in Nos. 20–25 is more advantageous. Even when the plate-like metal was used, Nos. 7–12 were relatively good. It is considered that this is because the superior dispersibility of carbon black brought about good results. In any case, these were all far superior to the conventional example, No. 26.

With reference to the current collectors, both of plate-like and net-like collectors comprising Ag or comprising other materials plated with Ag are superior to those of the other materials. From this fact, Ag based collectors are especially advantageous when used under high load. Those which are plated with Ag are preferred when cost is also taken into consideration.

Next, the batteries of Nos. 1–6 and 13 were subjected to a high temperature overdischarging test. That is, these batteries with connecting to a constant resistance of 3 kΩ were left to stand in an atmosphere at a high temperature of 60° C. for 40 days. Then, they were charged at a constant voltage of 2 V for 10 hours and compared in discharging at 0.5 mA, and the capacity until a voltage reached 1 V was measured and a retention rate of capacity to initial capacity is also shown in Table 2. The retention rate of No. 13 which used Cd was very bad. On the other hand, Nos. 1–6 were relatively good and Nos. 1 and 2 were especially good. It is considered that in the case of No. 13 which used Cd, the potential of the negative electrode increased during overdischarging to bring about a dissolution phenomenon and to cause deterioration. On the other hand, it is considered that Nos. 1–6 withstand against the increase of potential and Pt and Ag are especially superior in corrosion resistance.

From these results, it is clear that the storage stability of battery can be improved while withstanding overdischarging by using a corrosion-resistant metal as the conductive material of the negative electrode or the current collector of the negative electrode.

As a second effect, it has been further found that the molding strength can be sharply improved by adding a metal powder to niobium pentoxide. The strength has been improved to about 2 times the strength obtained when only carbon black is added. This is very effective for mass-production. Although the reason therefor is not clear, it is considered that strong secondary particles are formed with the metal powders being cores.

Next, using the batteries of Example 3, the initial capacity was confirmed and then stored at a high temperature of 60° C. for 40 days and the retention rate of capacity to initial capacity was examined in the same manner as in Example 1. As in Example 1, the results are that those which used carbon black were less than 50% in retention rate and those which used Ag had a high retention rate of capacity of higher than 85%.

From the above, it can be considered that the present invention is achieved regardless of the materials of positive electrodes and can be applied to all batteries which use organic electrolytes.

Furthermore, nearly the same results as in Example 1 were also obtained when titanium dioxide, tungsten oxide, or tantalum oxide was used as metal oxide used for the negative electrode besides niobium pentoxide.

As explained above, when the negative electrode of the present invention is used, there can be provided lithium secondary batteries which are not only excellent in charging and discharging cycle, but also are markedly improved in storage properties as batteries which withstand overdischarging and are excellent in reliability and mass-productivity.

What is claimed is:

1. A lithium secondary battery which comprises a positive electrode, a negative electrode, a negative electrode case, a current collector and an electrolyte comprising an organic solvent in which a lithium salt is dissolved, said negative electrode comprising niobium pentoxide doped with lithium and a conductive material, said conductive material comprising a corrosion-resistant metal powder.

2. A lithium secondary battery according to claim 1, wherein said corrosion-resistant metal powder is selected from the group consisting of Pt, Ag, Ni, Al, Cu, and Mo.

3. A lithium secondary battery according to claim 1, wherein said conductive material comprises in major part said corrosion-resistant metal powder and in minor part a carbon powder.

4. A lithium secondary battery according to claim 3, wherein said carbon powder is a carbon black powder.

5. A lithium secondary battery according to claim 1, wherein said positive electrode is made of vanadium pentoxide.

6. A lithium secondary battery according to claim 1, wherein said current collector comprises a plate or porous body of a corrosion-resistant metal which is welded to the inner surface of said negative electrode case which contacts said negative electrode.

7. A lithium secondary battery according to claim 6, wherein said corrosion-resistant metal is selected from the group consisting of Pt, Ag, Ni, and stainless steel.

8. A lithium secondary battery according to claim 6, wherein said porous body is in a net or lath form.

9. A lithium secondary battery according to claim 6, wherein said current collector is made of a stainless steel plated with Ag thereon.

10. A lithium secondary battery which comprises a positive electrode, a negative electrode and an electrolyte comprising an organic solvent in which a lithium salt is dissolved, said negative electrode comprising a member doped with lithium and a conductive material, said member being selected from the group consisting of niobium pentoxide, titanium dioxide, tungsten oxide and tantalum oxide, said conductive material comprising a corrosion-resistant metal powder.

11. A lithium secondary battery which comprises a positive electrode of vanadium pentoxide, a negative electrode of niobium pentoxide doped with lithium and containing a corrosion-resistant conductive material incorporated therein and an electrolyte comprising an organic solvent in which a lithium salt is dissolved, said corrosion-resistant conductive material comprising a corrosion-resistant metal powder and 3 wt % or less of a carbon black powder.

* * * * *